United States Patent [19]

Matsuura et al.

[11] Patent Number: 4,985,515

[45] Date of Patent: Jan. 15, 1991

[54] PROCESS FOR POLYMERIZATION OF α-OLEFIN

[75] Inventors: Mitsuyuki Matsuura; Takashi Fujita, both of Yokkaichi, Japan

[73] Assignee: Mitsubishi Petrochemical Company, Ltd., Tokyo, Japan

[21] Appl. No.: 381,997

[22] Filed: Jul. 17, 1989

Related U.S. Application Data

[63] Continuation of Ser. No. 84,835, Aug. 13, 1987, abandoned.

[30] Foreign Application Priority Data

Aug. 18, 1986 [JP] Japan .................. 61-192519

[51] Int. Cl.$^5$ .................. C08F 4/654; C08F 10/06
[52] U.S. Cl. .................. 526/125; 502/108; 526/119; 526/124; 526/127; 526/128; 526/142; 526/904
[58] Field of Search .............. 526/119, 124, 127, 128, 526/142

[56] References Cited

U.S. PATENT DOCUMENTS 4,276,400  6/1981  Bissell .................. 526/152
4,387,198  6/1938  Sato et al. .................. 526/97

OTHER PUBLICATIONS

*Patent Abstracts of Japan*, vol. 6, No. 257 (C-140) [1135], Dec. 18th, 1982; & JP-A-57 151 602 (Mitsui Toatsu Kagaku K.K.), 18-09-1982.
*Patent Abstracts of Japan*, vol. 7, No. 225 (C-189) [1370], Oct. 6th, 1983; & JP-A-58 120 610 (Mitsui Toatsu Kagaku K.K.), 18-07-1983.

*Primary Examiner*—Edward J. Smith
*Attorney, Agent, or Firm*—Oblon, Spivak, McClelland, Maier & Neustadt

[57] ABSTRACT

There is provided a process for polymerization of an α-olefin which comprises polymerizing an α-olefin in the presence of a catalyst which is a combination of a solid component (A), which is obtained by subjecting a composition ($A_O$) comprising as the essential ingredients titanium, magnesium and a halogen to preliminary polymerizatoin of the α-olefin conducted in the presence of said composition in a slurry and an organoaluminum compound, and an organoaluminum compound (B), said preliminary polymerization being conducted in two steps: the first step wherein the concentration of said composition ($A_O$) in the slurry is adjusted to 10–100 g/lit.-solvent and polymerization of the α-olefin is conducted at 30° C. or lower so that the amount of a polymer produced is 0.001 to 1 g per gram of said composition and the second step wherein polymerization of the α-olefin is conducted at 60° C. or higher under the same condition of the concentration of said composition as in the first step so that the amount of a polymer produced is 1 to 10 g per gram of said composition.

According to this process, an α-olefin is polymerized at a possible elevated temperature and an α-olefin polymer having high stereoregularity, excellent polymer properties and improved odor is produced in a high yield.

23 Claims, No Drawings

PROCESS FOR POLYMERIZATION OF α-OLEFIN

This application is a continuation of application Ser. No. 07/084,835, filed on Aug. 13, 1987, now abandoned.

BACKGROUND OF THE INVENTION

1. Field of the Art

This invention relates to a process for producing an α-olefin polymer having high stereoregularity, excellent polymer properties and reduced odor in a high yield at a possible elevated polymerization temperature. More particularly, this invention relates to a process for polymerizing an α-olefin characterized by the use as a transition metal component of a Ziegler catalyst of a specific solid catalyst component which is obtained through a preliminary polymerization conducted under specific conditions.

2. Prior Art

It has been known in the art to polymerize an α-olefin having 3 or more carbon atoms using a catalyst component comprising a titanium compound supported on a magnesium compound. Further, it has been known that a polyolefin having some improved stereoregularity can be obtained by using the above mentioned catalyst component prepared by particular methods, and a number of inventions concerning such methods have been proposed.

In these prior art techniques, the catalyst activity is high to some extent, but the polymer properties of the polymer produced are not entirely satisfactory and improvements thereof have been desired. The polymer properties are extremely important in polymerization processes such as slurry polymerization, and gas phase polymerization. If the polymer properties are poor, polymer adhesion within the polymerization vessel or difficulty in polymer withdrawal from the polymerization vessel, etc., may be caused.

Also, the polymer concentration within a polymerization vessel is intimately related with the polymer properties and cannot be made high unless the polymer properties are good. It is very disadvantageous in industrial production when the polymer concentration cannot be made high.

Another problem involved in the prior art is an odor of polymer. The odor of polymer, the cause of which is still not well known, makes the practical use of a polymer difficult depending on the level of odor. In most cases in the practical production of a polymer the problem of polymer odor is so serious as to require some treatments and, in fact, a deodorizing treatment is usually conducted. Thus, the development of a catalyst which will provide a polymer with improved odor has been desired.

In Japanese Patent Publication No. 45,244/1982 is proposed a process wherein a preliminary polymerization is conducted in the presence of a catalyst system which consists of a solid catalyst component comprising a magnesium compound, a titanium compound and an electron donor and an organoaluminum compound. In this process about 100 moles or more of an α-olefin having 3 or more carbon atoms is preliminarily polymerized per mol of the titanium component in the solid catalyst component. For carrying out this preliminary polymerization is required an additional polymerization vessel, which means the need of an extra equipment investment in the industrial operation.

Japanese Patent Publications Nos. 11,085/64 and 32,312/72 also disclose the technique of preliminary polymerization. In these inventions, however, the amount of polymer produced in the preliminary polymerization is considerably much, which is disadvantageous in the production in an industrial scale. It is preferable in the industrial operation to reduce the amount of polymer to be produced in the preliminary polymerization. If the amount can be reduced, an extra equipment investment can be avoided.

In Japanese Patent Publication No. 151,602/82 is proposed a process wherein a preliminary polymerization is conducted such that the amount of polymer produced in the preliminary polymerization is 0.01 to 1 gram per gram of the solid catalyst component used and then the successive polymerization is conducted. However, this process appears still inadequate to improve the above mentioned properties of a polymer.

SUMMARY OF THE INVENTION

An object of the present invention is to provide a solution to the above described problems by providing a method which consists of a specific preliminary polymerization and the successive polymerization using a specific solid catalyst component.

More specifically, the present invention provides a process for polymerization of an α-olefin which comprises polymerizing an α-olefin in the presence of a catalyst which is a combination of a solid component (A), which is obtained by subjecting a composition ($A_0$) comprising as the essential ingredients titanium, magnesium and a halogen to preliminary polymerization of the α-olefin conducted in the presence of said composition in a slurry and an organoaluminum compound, and an organoaluminum compound (B), said preliminary polymerization being conducted in two steps: the first step wherein the concentration of said composition ($A_0$) in the slurry is adjusted to 10–100 g/lit.-solvent and polymerization of the α-olefin is conducted at 30° C. or lower so that the amount of a polymer produced is 0.001 to 1 g per gram of said composition and the second step wherein polymerization of the α-olefin is conducted at 60° C. or higher under the same condition of the concentration of said composition as in the first step so that the amount of a polymer produced is 1–10 g per gram of said composition.

In accordance with the present invention, a polymer having high stereoregularity, reduced odor and excellent polymer properties in bulk density, particle size, particle size distribution and the like is obtained in a high yield. As regards bulk density of a polymer, which is one of the indices of the polymer properties, it is possible to make it raise up to 0.45–0.50 g/cc. With respect to particle size distribution, generation of coarse particles and ultra fine particles such as below 70 μ is diameter may be substantially suppressed.

The odor of a polymer obtained according to the present invention is considerably improved as compared with that of a conventional polymer to reach at the level of practical use without the use of an extra deodorizing treatment. The reason why odor of polymer is so improved according to the present invention is not fully understood yet. In this connection, however, there has been confirmed an experimental fact that when the preliminary polymerization of the present invention is conducted while the solid component contains an electron donor, a decrease in the amount of the electron donor is observed. This fact may be related to the improvement in the level of polymer odor.

Furthermore, in accordance with the process of the present invention it is possible to elevate the polymerization temperature. Generally, elevation of polymerization temperature often entails various problems including deterioration in polymer properties, increase in the amount of atactic polymer produced and so on. According to the present invention, the polymerization temperature can be elevated, without causing such problems, by about 10°–15° C. as compared with a conventionally used temperature, which is very advantageous in that the productivity of a polymer can be remarkably increased.

DETAILED DESCRIPTION OF THE INVENTION

Catalyst

The catalyst to be used in the present invention is a combination of a solid component (A), which is obtained by subjecting a composition ($A_0$) comprising as the essential ingredients titanium, magnesium and a halogen to preliminary polymerization of an α-olefin in the presence of said composition ($A_0$) in a slurry and an organoaluminum, and an organoaluminum compound (B). The term "a combination" herein means that any auxiliary component such as an electron donor may be included so far as it is suited for the object.

Component (A)

The component (A) is a solid component which is produced by subjecting a composition ($A_0$) comprising as the essential ingredients titanium, magnesium and a halogen to preliminary polymerization of an α-olefin. As the composition ($A_0$), any known composition may be used. For example, there can be used solid components disclosed in Japanese patent Application Laid-Open Specification Nos. 45,688/1978, 3,894/1979, 31,092/1979, 39,483/1979, 94,591/1979, 118,484/79, 131,589/1979, 75,411/1980, 90,510/1980, 90,511/1980, 127,405/1980, 147,507/1980, 155,003/1980, 18,609/1981, 70,005/1981, 72,001/1981, 86,905/1981, 90,807/1981, 155,206/1981, 3,803/1982, 34,103/1982, 92,007/1982, 121,003/1982, 5,309/1983, 5,310/1983, 5,311/1983, 8,706/1983, 27,732/1983, 32,604/1983, 32,605/1983, 67,703/1983, 117,206/1983, 127,708/1983, 183,708/1983, 183,709/1983, 149,905/1984 and 149,906/1984.

As the magnesium compound used as the magnesium source in the present invention, there can be mentioned a magnesium dihalide, a dialkoxy magnesium, an alkoxy magnesium halide, a magnesium oxyhalide, a dialkyl magnesium, magnesium oxide, magnesium hydroxide, and carboxylic acid (preferably of 2 to 20 carbon atoms) salts of magnesium. As the halogen of the halide, chlorine is preferred, and the alkyl or alkoxy group is preferably about $C_1$ to $C_6$.

Among them, a magnesium halide is preferred, particularly magnesium dichloride.

As the titanium compound used as the titanium source, there can be mentioned compounds represented by the following formula:

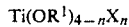

$$Ti(OR^1)_{4-n}X_n$$

wherein $R^1$ stands for a hydrocarbon residue, preferably a hydrocarbon residue having 1 to about 10 carbon atoms, X stands for a halogen atom and n is a number of from 0 to 4.

As specific examples, there can be mentioned $TiCl_4$, $TiBr_4$, $Ti(OC_2H_5)Cl_3$, $Ti(OC_2H_5)_2Cl_2$, $Ti(OC_2H_5)_3Cl$, $Ti(O\text{-}i\text{-}C_3H_7)Cl_3$, $Ti(O\text{-}n\text{-}C_4H_9)Cl_3$, $Ti(O\text{-}n\text{-}C_4H_9)_2Cl_2$, $Ti(OC_2H_5)Br_3$, $Ti(OC_2H_5)(OC_4H_9)_2Cl$, $Ti(O\text{-}n\text{-}C_4H_9)_3Cl$, $Ti(O\text{-}C_6H_5)Cl_3$, $Ti(O\text{-}i\text{-}C_4H_9)_2Cl_2$, $Ti(OC_5H_{11})Cl_3$, $Ti(OC_6H_{13})Cl_3$, $Ti(OC_2H_5)_4$, $Ti(O\text{-}n\text{-}C_3H_7)_4$, $Ti(O\text{-}n\text{-}C_4H_9)_4$, $Ti(O\text{-}i\text{-}C_4H_9)_4$, $Ti(O\text{-}n\text{-}C_6H_{13})_4$, $Ti(O\text{-}n\text{-}C_8H_{17})_4$ and $Ti[OCH_2CH(C_2H_5)C_4H_9]_4$. Among these titanium compounds, $TiCl_4$, $Ti(OC_2H_5)Cl_3$, $Ti(O\text{-}n\text{-}C_4H_9)Cl_3$ and $Ti(OC_2H_5)_4$ are preferred, and $TiCl_4$ and $Ti(O\text{-}n\text{-}C_4H_9)_4$ are more preferred.

Molecular compounds formed by reaction of $TiX'_4$ (in which X' stands for a halogen atom) with an electron donor can also be used. As specific examples, $TiCl_4\cdot CH_3COC_2H_5$, $TiCl_4\cdot CH_3CO_2C_2H_5$, $TiCl_4\cdot C_6H_5NO_2$, $TiCl_4\cdot CH_3COCl$, $TiCl_4\cdot C_6H_5COCl$, $TiCl_4\cdot C_6H_5CO_2C_2H_5$, $TiCl_4\cdot ClCOC_2H_5$ and $TiCl_4\cdot C_4H_4O$ can be mentioned.

The halogen is ordinarily supplied by the above-mentioned magnesium halide and/or titanium halide, but a known halogenating agent such as an aluminum halide, a silicon halide or a phosphorus halide may be used as the halogen source.

As the halogen contained in the solid catalyst component, there can be mentioned fluorine, chlorine, bromine, iodine and a mixture thereof, and chlorine is especially preferred.

The composition ($A_0$) can be prepared by using an electron donor compound as an internal electron donor.

As the electron donor (internal donor) used for the preparation of the composition, there can be used oxygen-containing electron donors such as alcohols, phenols, ketones, aldehydes, carboxylic acids, esters of organic acids and inorganic acids, ethers, acid amides and acid anhydrides; and nitrogen-containing electron donors such as ammonia, amines, nitriles and isocyanates.

More specifically, there can be mentioned alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol and isopropylbenzyl alcohol; phenols having 6 to 25 carbon atoms, which can have an alkyl group, such as phenol, cresol, xylenol, ethylphenol, propylphenol, cumylphenol, nonylphenol and naphthol; ketones having 3 to 15 carbon, atoms, such as acetone, methylethylketone, methylisobutylketone, acetophenone and, benzophenone; aldehydes having 2 to 15 carbon atoms such as acetaldehyde, propionaldehyde, octylaldehyde, benzaldehyde, tolualdehyde and naphthaldehyde; esters of an organic acid having 2 to 20 carbon atoms such as methyl formate, methyl acetate, ethyl acetate, vinyl acetate, propyl acetate, octyl acetate, cyclohexyl acetate, ethyl propionate, methyl butyrate, ethyl valeate, ethyl stearate, methyl chloroacetate, ethyl dichloroacetate, methyl methacrylate, ethyl crotonate, ethyl cyclohexane-carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, cumarine, phthalide, ethylene carbonate, cellosolve acetate, Methylcellosolve acetate, n-Butylcellosolve acetate, Cellosolve isobutyrate and Cellosolve benzoate; esters of an inorganic acid such as ethyl silicate, butyl silicate, phenyltriethoxysilane and other silicic acid esters; acid halides having 2 to 15 carbon atoms such as acetyl chloride, benzoyl chloride, toluoyl chloride, anisoyl chloride, phthaloyl chloride and isophthaloyl chloride; ethers having 2 to 20 carbon atoms such as methyl ether, ethyl ether, isopropylether, butyl ether, amyl ether, tetrahydrofuran, anisole and diphenyl ether; acid amides such as acetic acid amide, benzoic acid amide and toluylic acid amide; amines such as methylamines, ethylamines, diethylamine, tributylamine, piperidine, tribenzylamine, aniline, pyridine, picoline and tetramethyl ethylene diamine; and nitriles such as acetonitrile, benzonitrile and toluinitrile. A mixture of two or more of these electron donors can be used.

The preferable as the internal electron donor are esters of an organic acid or acid halides, and the more preferable are esters of phthalic acid, phthaloyl halides, esters of cellosolves, such as lower alkyl phthalates, phthaloyl chloride and cellosolve acetate respectively, and the more preferable are phthaloyl halides such as phthaloyl chlorides.

The composition ($A_0$) used in the present invention can be prepared according to known methods using the above mentioned titanium source, magnesium source and halogen source and optional other ingredients such as an electron donor, preferably the methods described below. Specific examples of the compounds referred to in the following description are those as described above.

(a) A magnesium dihalide is contacted with, if necessary, an electron donor and a titanium-containing compound.

(b) Alumina or magnesia is treated with a phosphorus halide compound and is then contacted with a magnesium halide, an electron donor and a halogen-containing titanium compound.

(c) A magnesium halide is contacted with a titanium tetra-alkoxide and a polymeric silicon compound and the obtained solid component is contacted with a halogen-containing titanium compound and/or a silicon halide. The polymeric silicon compound is represented by the following formula:

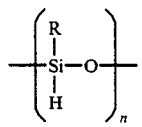

(1)

wherein R stands for a hydrocarbon residue having 1 to 10 carbon atoms, preferably 1 to 6 carbon atoms, and n is a degree of polymerization, which is preferably such that the polymer has a viscosity of 0.1 to 100 centistokes (cSt).

Among them, methylhydrogenpolysiloxane, 1,3,5,7-tetramethylcyclotetrasiloxane, 1,3,5,7,9-pentamethylcyclopentasiloxane, ethylhydrogenpolysiloxane, phenylhydrogenpolysiloxane, cyclohexylhydrogenpolysiloxane, etc., are preferred.

(d) A magnesium compound is dissolved by means of a titanium tetra-alkoxide and an electron donor, a solid component is precipitated from the solution by a titanium- and halogen-compound or halogenating agent, and the solid component is contacted with a titanium compound.

(e) An organic magnesium compound such as a Grignard reagent is reacted with a halogenating agent and a reducing agent, and the reaction product is, according to necessity, contacted with an electron donor and a titanium compound.

(f) A magnesium alkoxide is contacted with a halogenating agent and/or a titanium compound in the presence or absence of an electron donor.

Among these specific examples, method (c) is preferred.

In addition to the foregoing essential ingredients, the composition ($A_0$) used in the present invention can comprise another ingredient, for example, a silicon compound such as silicon halides, e.g., $SiCl_4$, mono- or di-silanes optionally having a halogen and/or a lower alkyl substituent, e.g., $CH_3SiCl_3$, $HSiCl_3$, $H(CH_3)SiCl_2$, $H[Si(CH_3)_2O]_2Si(CH_3)_2H$, methylhydrogen polysiloxane of a formula (1) given hereinbefore, oligosiloxanes, e.g. 1,3,5,7-tetramethylcyclotetrasiloxane and 1,3,5,7,9-pentamethylcyclopentasiloxane; an aluminum compound such as $Al(O-i-C_3H_8)_3$, $AlCl_3$, $AlBr_3$, $Al(OC_2H_5)_3$ and $Al(OCH_3)_2Cl$; or a boron compound such as $B(OCH_3)_3$, $B(OC_2H_5)_3$ and $B(OC_6H_5)_3$, and these ingredients can be left as the silicon, aluminum and boron ingredients in the solid catalyst component.

The amounts used of the respective ingredients are not particularly critical, so far as the intended effects of the present invention are attained. However, the amounts described below are generally preferred.

The titanium compound is used in such an amount that the molar ratio to the amount used of the magnesium compound is $1 \times 10^{-4}$ to 1,000, preferably 0.01 to 10. When the halogenating agent is used, the molar ratio of the amount of the halogenating agent to the amount used of the magnesium compound is $1 \times 10^{-2}$ to 1,000, preferably 0.1 to 100, irrespective of whether or not the titanium compound and/or the magnesium compound contains a halogen. The amount used of each of the silicon, aluminum and boron compounds is such that the molar ratio to the amount used of the magnesium compound is $1 \times 10^{-3}$ to 100, preferably 0.01 to 1.

The amount used of the electron donor compound is such that the molar ratio to the amount used of the magnesium compound is $1 \times 10^{-3}$ to 10, preferably 0.01 to 5.

The conditions for contacting the above said each component are not particularly critical, so far as the intended effects of the present invention can be attained, but conditions described below are ordinarily preferred. The contact temperature is about $-50°$ to about $200°$ C., preferably $0°$ to $100°$ C. As the contacting method, there can be mentioned a mechanical method in which a rotary ball mill, a vibrating mill, a jet mill or a medium stirring pulverizer is used, and a method in which the contact is effected by stirring in the presence of an inert diluent. As the inert diluent, there can be mentioned an aliphatic or aromatic hydrocarbon, a halogenated hydrocarbon and a polysiloxane.

Preliminary Polymerization

The preliminary polymerization of the present invention comprises contacting an α-olefin with a catalyst system consisting of the above mentioned composition ($A_0$) and an organoaluminum compound to polymerize a small amount of an α-olefin in two steps.

A characteristic feature of the preliminary polymerization in accordance with the present invention is that it is conducted in two steps. Thus, in the first step an α-olefin is polymerized at a temperature of 30° C. or lower so that 0.001 to 1 g of the α-olefin is polymerized per gram of the composition ($A_0$) and in the second step the α-olefin is polymerized at a temperature of 60° C. or higher so that 1 to 10 g of the α-olefin is polymerized per gram of the composition ($A_0$).

Another characteristic feature is that in the first and second steps of the preliminary polymerization the concentration of the composition which is in a slurry is adjusted within the range of from 10 g/lit.-solvent to 100 g/lit.-solvent. The intended effect of the present invention is not obtained when the concentration is outside the above range.

Furthermore, the preferred range of the above mentioned conditions in the preliminary polymerization is as follows.

In the first step of the preliminary polymerization it is preferred that the polymerization temperature be from 10° to 20° C. and the amount of an α-olefin polymer produced be from 0.1 to 0.7 g per gram of the composition ($A_0$) It is preferred in the second step of the preliminary polymerization that the polymerization temperature be from 70° to 85° C. and the amount of an olefin polymer produced be from 2 to 5 g per gram of the composition ($A_0$) The sum of the amount of an α-olefin polymer produced in the respective steps is preferably from 1 to 5 g per gram of the composition ($A_0$). The concentration of the composition ($A_0$) in the respective steps is preferably from 20 to 50 g/lit.-solvent.

Any organoaluminum compounds known as a component in Ziegler-type catalysts can be used for the preliminary polymerization. For example, there can be mentioned $Al(C_2H_5)_3$, $Al(i-C_4H_9)_3$, $Al(C_6H_{13})_3$, $Al(C_8H_{17})_3$, $Al(C_{10}H_{21})_3$, $Al(C_2H_5)_2Cl$, $Al(i-C_4H_9)_2Cl$, $Al(C_2H_5)_2H$, $Al(i-C_4H_9)_2H$ and $Al(C_2H_5)_2(OC_2H_5)$.

Among these organoaluminum compounds, $Al(C_2H_5)_3$ and $Al(i-C_4H_9)_3$ are especially preferred. Furthermore, a combination of a trialkylaluminum and an alkylaluminum halide and a combination of a trialkylaluminum, an alkylaluminum halide and an alkylaluminum ethoxide are effective. For example, there can be mentioned a combination of $Al(C_2H_5)_3$ and $Al(C_2H_5)_2Cl$, a combination of $Al(i-C_4H_9)_3$ and $Al(i-C_4H_9)_2Cl$, a combination of $Al(C_2H_5)_3$ and $Al(C_2H_5)_{1.5}Cl_{1.5}$, and a combination of $Al(C_2H_5)_3$, $Al(C_2H_5)_2Cl$ and $Al(C_2H_5)_2(OC_2H_5)$.

The amount of the organoaluminum compound used for the preliminary polymerization to the amount of the Ti component in the solid catalyst component is such that the Al/Ti molar ratio is from 2 to 20, preferably from 3 to 10. At the preliminary polymerization, a known electron donor such as an alcohol, an ester or a ketone may be added in addition to the organoaluminum compound. Among these electron donors, an ester of organic acid and/or an alkoxide containing compound of silicon are preferred.

As the olefin used for the preliminary polymerization, there can be mentioned ethylene, propylene, 1-butene, 1-hexene and 4-methylpentene-1. Among them, propylene is preferred. Hydrogen may be present at the preliminary polymerization.

Moreover, in the preparation of the solid component (A), silicon compounds represented by the following general formula may be additionally used to improve the catalyst ability thereby improving the stereoregularity, polymer properties including bulk density and order of the resulting polymer and the catalyst activity and so on.

$$R^2R^3{}_{3-n}Si(OR^4)_n$$

wherein $R^2$ stands for a branched hydrocarbon residue, $R^3$ stands for a hydrocarbon residue, which may be the same as or different from $R^2$, $R^4$ stands for a hydrocarbon residue, and n is a number of from 1 to 3.

It is preferred that $R^2$ be branched from the carbon atom adjacent to the silicon atom, and in this case, it is preferred that the branched group be an alkyl group, a cycloalkyl group, or an aryl group such as for example, a phenyl group or a methyl-substituted phenyl group. Furthermore, it is preferred that in $R^2$, the carbon atom adjacent to the silicon atom, that is, the carbon atom at the α-position, is a secondary or tertiary carbon atom. It is especially preferred that the carbon atom bonded to the silicon atom is a tertiary carbon atom. The $R^2$ is ordinarily of 3 to 20 carbon atoms, preferably 4 to 10 carbon atoms. Generally, $R^3$ is a branched or linear aliphatic hydrocarbon group having 1 to 20 carbon atoms, preferably 1 to 10 carbon atoms. $R^4$ is ordinarily an aliphatic hydrocarbon group, preferably a linear aliphatic hydrocarbon group having 1 to 4 carbon atoms.

Specific examples of the silicon compounds are as follows.

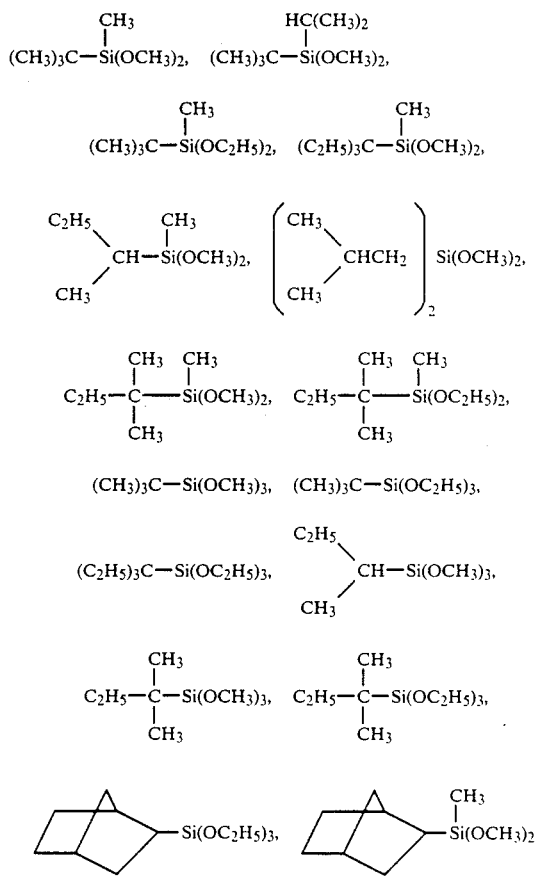

-continued

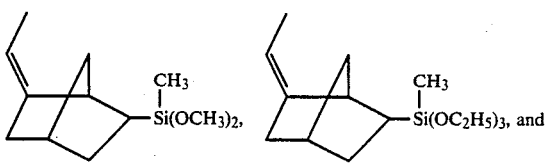

Among them, (CH$_3$)$_3$CSi(OCH$_3$)$_2$, (CH$_3$)$_3$CSi(OCH$_3$)$_3$,
$|$
CH$_3$

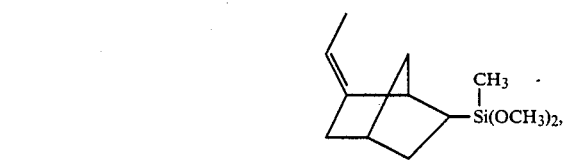

are preferred.

The addition of the above silicon compound may be carried out, during the preparation of the solid component (A), either by contacting the silicon compound with the composition (A$_0$) before the composition (A$_0$) undergoes the preliminary polymerization or by contacting the silicon compound with the solid component (A$_0$) which has undergone the preliminary polymerization, namely the solid component (A).

When the silicon compound as described above is used, the contact conditions may be as desired, as long as the effect of the present invention can be realized, but generally the following conditions are preferred. The contact temperature may be −50° to about 200° C., preferably 0° to 100° C. As the contact method, a mechanical method by means of a rotatory ball mill, a vibrating mill, a jet mill, a medium stirring crusher, etc., or a method in which contact is effected by stirring in the presence of an inert diluent may be employed. As the inert diluent to be used in this method, aliphatic or aromatic hydrocarbons or halohydrocarbons, polysiloxane, etc., may be employed.

The effect obtained by the contact of the silicon compound with the solid component (A or A$_0$) increases as the frequency of contact increases.

In the contact, other compounds such as an aluminum halide, an alkylhydrogen polysiloxane and an organoaluminum compound may be added as an optional component.

The amount of the silicon compound used may be within the range of from 0.01 to 1000 in terms of molar ratio of silicon in the compound to titanium in the solid compound, preferably within the range of from 0.1 to 100.

The solid component (A) thus obtained is used in the preliminary polymerization of an α-olefin in combination with an organoaluminum compound which is a co-catalyst.

Component (B)

The component (B) is an organoaluminum compound. For example, there can be used organoaluminum compounds represented by the following general formula:

$$R^5{}_{3-n}AlX_n \text{ or } R^6{}_{3-m}Al(OR^7)_m$$

wherein R$^5$ and R$^6$, which may be the same or different, each stand for a hydrocarbon residue having 1 to about 20 carbon atoms or a hydrogen atom, R$^7$ stands for a hydrocarbon residue, X stands for a halogen atom, n is a number of $0 \leq n < 2$, and m is a number of $0 \leq m \leq 1$.

As specific examples, there can be mentioned (a) trialkylaluminum compounds such as trimethylaluminum, triethylaluminum, tri-isobutylaluminum, trihexylaluminum, trioctylaluminum and tridecylaluminum, (b) alkylaluminum halides such as diethylaluminum monochloride, di-isobutylaluminum monochloride, ethylaluminum sesquichloride and ethylaluminum dichloride, (c) alkylaluminum hydrides such as diethylaluminum hydride and di-isobutylaluminum hydride and (d) aluminum alkoxides such as diethylaluminum ethoxide and diethylaluminum phenoxide.

In combination with the organoaluminum compounds (a) through (c), there may be used other organometal compounds such as alkylaluminum alkoxides represented by the following formula:

$$R^8{}_{3-a}Al(OR^9)_a$$

wherein a is a number of from 1 to 3, and R$^8$ and R$^9$, which may be the same or different, each stand for a hydrocarbon residue having 1 to about 20 carbon atoms.

For example, there can be mentioned a combination of triethylaluminum and diethylaluminum ethoxide, a combination of diethylaluminum monochloride and diethylaluminum ethoxide, a combination of ethylaluminum dichloride and ethylaluminum diethoxide, and a combination of triethylaluminum, diethylaluminum ethoxide and diethylaluminum chloride.

The amount used of the component (B) is such that the component (B)/component (A) weight ratio is from 0.5 to 1000, preferably from 1 to 100.

For improvement of stereoregularity of a polymer of an α-olefin having 3 or more carbon atoms, it is effective to add a known electron donative compound such as an ether, ester or amine and permit the same to coexist during polymerization. The amount of the electron donative compound to be used for such purpose may be 0.001 to 2 mols, preferably 0.01 to 1 mol per mol of the organoaluminum compound.

α-olefin

The olefin polymerized by the catalyst system obtained by using the present invention is represented by the following general formula:

$$R-CH=CH_2$$

wherein R stands for a hydrogen atom or a hydrocarbon residue having 1 to 10 carbon atoms, which can have a branched group.

As specific examples, there can be mentioned ethylene, propylene, butene-1, pentene-1, hexene-1 and 4-methylpentene-1, and ethylene and propylene are preferred. Ethylene may be copolymerized with up to 50% by weight, preferably up to 20% by weight, of an olefin as described above, and propylene may be copolymerized with up to 30% by weight of an olefin as described above, especially ethylene. Furthermore, copolymerization with other copolymerizable monomer (for example, vinyl acetate or a diolefin) may be carried out.

The catalyst obtained by using the present invention is used for not only slurry polymerization but also liquid phase solvent-free polymerization, solution polymerization or gas phase polymerization. Furthermore, the catalyst of the present invention can be used for continuous polymerization, batchwise polymerization or polymerization including preliminary polymerization.

In case of the slurry polymerization, there can be used as the polymerization solvent saturated aliphatic hydrocarbons and aromatic hydrocarbons such as hexane, heptane, cyclohexane, benzene, toluene and mixtures thereof. The polymerization temperature is room temperature to about 200° C., preferably 50° to 100° C., and more preferably 70° to 90° C.

In the case where the above mentioned silicon compound having a specific structure is used during the preparation of the solid component (A), the polymerization temperature may preferably be from 80° to 90° C. The polymerization pressure is atmospheric pressure to about 100 Kg/cm$^2$, preferably 1 to 50 Kg/cm$^2$. Hydrogen can be used for adjusting the molecular weight of the polymer to be produced.

In case of the slurry polymerization, the concentration of the solid component (A) employed during the polymerization is usually within the range of 0.0001 to 0.1 g/lit.-solvent, which differs much from the concentration range employed during the preliminary polymerization.

EXPERIMENTAL EXAMPLES

In the following examples, the level of odor of a polymer produced was determined organoleptically and ranked as follows.

| Rank | Level of odor |
|---|---|
| grade 1 | no odor |
| 2 | faint odor (no problem for practical use) |
| 3 | some odor |
| 4 | considerable odor |
| 5 | strong odor |

EXAMPLE 1

(Preparation of solid component (A))

Into a flask thoroughly purged with nitrogen were introduced 100 milliliters of dehydrated and deoxygenated n-heptane, then 0.3 mol of MgCl$_2$ and 0.6 mol of Ti(O-n-C$_4$H$_9$)$_4$ were introduced, and reaction was carried out at 95° C. for 2 hours. After completion of the reaction, the temperature was lowered to 40° C., and then 45 milliliters of methylhydrogenpolysiloxane (20 centistokes) was introduced, and reaction was carried out for 3 hours. The solid component formed was washed with n-heptane.

Into a flask thoroughly purged with nitrogen was introduced 50 milliliters of dehydrated and deoxygenated n-heptane, and the solid component prepared above was introduced in an amount of 0.2 mol as calculated on Mg atoms. Then, a mixture of 25 milliliters of n-heptane with 0.33 mol of SiCl$_4$ was introduced into the flask at 30° C. over 30 minutes, and reaction was carried out at 90° C. for 4 hours.

Next, a mixture of 10 milliliters of n-heptane with 0.02 mol of diheptyl phthalate was introduced into the flask at 70° C. over 30 minutes, and reaction was carried out at 90° C. for 1 hour. After completion of the reaction, the product was washed with 1 liter of n-heptane two times. Subsequently, 15 milliliters of TiCl$_4$ was introduced at 30° C. and reaction was carried out at 100° C. for 4 hours. Thus a composition (A$_0$) comprising as the essential ingredients titanium, magnesium and a halogen was obtained.

Into a stirring vessel made of stainless steel of an inert volume of 1.5 liter equipped with stirring and temperature control means, 500 milliliters of thoroughly dehydrated and deoxygenated n-heptane, 4.3 grams of triethylaluminum and 20 grams of the composition obtained above were introduced. With the temperature within the stirring vessel controlled at 20° C., propylene was introduced at a constant rate, and polymerization was conducted for 30 minutes. After completion of the polymerization, the product was thoroughly washed with n-heptane. A part of the product was taken out for examination of the amount of propylene polymerized, which was found to be 0.57 gram per gram of the composition. Then, 3.7 grams of triethylaluminum was added and the temperature within the vessel was raised to 75° C., thereafter propylene was introduced at a constant rate and polymerization of propylene was conducted for 60 minutes. After completion of the polymerization, the product was thoroughly washed with n-heptane. A part of the product was taken out for examination of the amount of propylene polymerized, which was found to be 5.2 grams per gram of the composition (i.e. 4.6 grams in the second step). The content of diheptyl phthalate in the solid component (A) was measured and found to be 2.5% by weight.

The solid component (A) thus obtained was used in the polymerization of propylene shown below.

(Polymerization of propylene)

Into an autoclave made of stainless steel of an inner volume of 1.5 liter equipped with stirring and temperature control means were introduced 500 milliliters of thoroughly dehydrated and deoxygenated n-heptane, 125 milligrams of triethylaluminum, 26.8 milligrams of diphenyldimethoxysilane and 60 milliliters of hydrogen were introduced and the temperature within the autoclave was raised to 80° C., and then 15 milligrams of the solid component (A) obtained above was introduced. Then propylene was introduced and polymerization was conducted at 80° C. under a pressure of 5 kg/cm$^2$G for 2 hours.

After completion of the polymerization, the polymer slurry obtained was separated by filtration, and the polymer was dried. As a result, 243 grams of a polymer was obtained. On the other hand, 1.1 gram of polymer was obtained from the filtrate. According to the boiling n-heptane extraction test, the total isotactic index (hereinafter being abbreviated as T-I.I) was found to be 98.4% by weight. The MFR and bulk density of the polymer were found to be 3.4 g/10 min. and 0.47 g/cc,. respectively. As its odor of the polymer, it was determined as grade-2, the level of no problem for practical use.

COMPARATIVE EXAMPLES 1 TO 3

Preliminary polymerization was conducted as in Example 1 except that the amount of polymer produced was changed as shown in Table 1, and the subsequent polymerization of propylene was conducted as in Example 1. The results are shown in Table 1 together with that of Example 1.

TABLE 1

| Example No. | Amount of pre-polymerized* polymer (g) First step | Amount of pre-polymerized* polymer (g) Second step | Content of diheptyl phthalate (wt. %) | Polymer yield (g) | T-I.I (wt. %) | MFR (g/10 min.) | Polymer bulk density (g/cc) | Level of odor (grade) |
| --- | --- | --- | --- | --- | --- | --- | --- | --- |
| Exam. 1 | 0.57 | 4.6 | 2.5 | 243 | 98.4 | 3.4 | 0.47 | 2 |
| Comp. Exam. 1 | 0.0005 | 5.1 | 3.9 | 193 | 98.1 | 4.0 | 0.40 | 3 |
| Comp. Exam. 2 | 0.1 | 0.5 | 4.3 | 231 | 98.3 | 3.8 | 0.46 | 3 |
| Comp. Exam. 3 | 0.8 | 35.4 | 2.8 | 174 | 98.2 | 3.1 | 0.38 | 2 |

*Amount of polypropylene produced in preliminary polymerization per gram of the composition ($A_0$).

EXAMPLE 2

(Preparation of solid component (A))

Into a flask thoroughly purged with nitrogen were introduced 75 milliliters of dehydrated and deoxygenated n-heptane, then 30 grams of anhydrous $MgCl_2$ (which had been pulverized in a ball mill for 24 hours) and 30 milliliters of $Ti(O-nC_4H_9)_4$ were introduced, and reaction was carried out at 70° C. for 1 hour. Then a mixture of 204 milliliters of n-butanol and 25 milliliters of n-heptane was introduced over 30 minutes, and reaction was conducted at 70° C. for 1 hour. Next, a mixture of 0.036 mol of ethyl benzoate and 25 milliliters of n-heptane was introduced at 70° C. over 0.5 hour and reaction was conducted at 90° C. for 1 hour. After completion of the reaction, the product was washed with n-heptane. Then, 225 milliliters of $TiCl_4$ was introduced and reaction was conducted at 110° C. for 3 hours. After the reaction the product was washed with n-heptane to obtain a composition ($A_0$) comprising as the essential ingredients titanium, magnesium and a halogen.

Into the stirring vessel used in Example 1 were introduced 257 milliliters of n-heptane purified as in Example 1, 7.5 grams of triisobutylaluminum and 20 grams of the composition obtained above. With the temperature within the vessel controlled at 10° C., the first step preliminary polymerization was conducted to produce polypropylene in an amount of 0.16 gram per gram of the composition. Subsequently, the second step preliminary polymerization was conducted to produce polypropylene in an amount of 8.7 grams per gram of the composition.

(Polymerization of propylene)

Polymerization of propylene was conducted under the polymerization conditions in Example 1 except for changing the temperature to 75° C. and using 52 milligrams of triethoxysilane in place of diphenyldimethoxysilane.

As a result, 153 grams of a polymer was obtained, with T-I.I=94.3 wt. % MFR=7.7 g/10 min., and polymer bulk density=0.39 g/cc. The level of order was grade 2.

EXAMPLE 3

(Preparation of solid component (A))

A solid component was synthesized as in Example 1 using $MgCl_2$, $Ti(O-nC_4H_9)_4$ and methylhydrogen polysiloxane, and the solid component was introduced into the flask used in Example 1 in an amount of 0.2 mol as calculated on Mg atoms. Then, a mixture of 25 milliliters of n-heptane and 0.33 mol of $SiCl_4$ was introduced at 30° C. over 1 hour, and reaction was conducted at 90° C. for 4 hours. After completion of the reaction, a mixture of 25 milliliters of n-heptane and 0.022 mol of phthalic acid chloride was introduced at 95° C. over 30 minutes and reaction was conducted at 95° C. for 1 hour. After completion of the reaction, the product was washed with n-heptane. Then, 0.1 mol of $SiCl_4$ was introduced and reaction was conducted at 95° C. for 6 hours. After the reaction, the product was washed with n-heptane to obtain a composition ($A_0$) comprising as the essential ingredients titanium, magnesium and a halogen.

Into the stirring vessel used in Example 1 were introduced 400 milliliters of n-heptane purified as in Example 1, 3.8 grams of triethylaluminum and 20 grams of the composition obtained above. With the temperature within the vessel controlled at 15° C., the first-step preliminary polymerization was conducted to produce polypropylene in an amount of 0.88 gram per gram of the composition and, subsequently, the second-step preliminary polymerization was conducted to produce polypropylene in an amount of 3.2 grams per gram of the composition. The solid component (A) thus obtained was used in the following polymerization.

(Polymerization of propylene)

Polymerization of propylene was conducted under the polymerization conditions in Example 1 except for changing the temperature to 85° C. As a result, 231 grams of a polymer was obtained, with T-I.I=98.7 wt. %, MFR=4.3 g/10 min. and polymer bulk density=0.48 g/cc. The level of odor was grade-2.

EXAMPLE 4

A solid component was prepared as in Example 3 through preliminary polymerization conducted under the same conditions as in Example 3. 5 grams of this solid component was introduced into a flask, and then 0.8 milliliter of

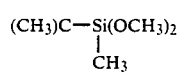

was introduced and contact was effected at 30° C. for 3 hours. After completion of the contact, the product was thoroughly washed with n-heptane to provide a solid component (A), which was used for polymerization shown below.

(Polymerization of propylene)

Polymerization was conducted under the conditions as in Example 1 except for not using diphenyldimethoxysilane. As a result, 236 grams of a polymer was obtained, with T-I.I=98.8 wt. %, MRF=2.1 g/10 min. and polymer bulk density=0.50 g/cc. The level of odor was grade-2.

EXAMPLES 5 AND 6 & COMPARATIVE EXAMPLES 4 AND 5

Preliminary polymerization was conducted as in Example 3 except for changing as shown in Table-2 the concentration of the composition ($A_0$) comprising as the essential ingredients titanium, magnesium and a halogen, and polymerization of propylene was conducted as in Example 3 except for using the solid component (A) obtained through the above-mentioned preliminary polymerization.

stead of diphenyldimethoxysilane and changing the polymerization temperature to 70° C.

As a result, 137 grams of a polymer was obtained, with T-I.I=98.1 wt. %, MFR=7.1 g/10 min. and polymer bulk density=0.46 g/cc. The level of odor was grade-2.

EXAMPLE 8

(Preparation of solid component (A))

A composition ($A_0$) comprising as the essential ingredients titanium, magnesium and a halogen was prepared as in Example 3.

Into the stirring vessel used in Example 3 were introduced 400 milliliters of thoroughly purified n-heptane, 3.4 grams of triethylaluminum and 20 grams of the composition above obtained.

The First-step preliminary polymerization was conducted while the temperature within controlling the temperature within the stirring vessel at 20° C. The amount of polypropylene polymerized was 0.7 gram per gram of the composition. After completion of the first-step preliminary polymerization, the product was thoroughly washed with n-heptane. Subsequently, 5.2 grams of triisobutylaluminum was added to the product,

TABLE 2

| Example No. | Concentration of composition* (g/l-heptane) | Polymer yield (g) | T-I.I (wt. %) | MFR (g/10 min.) | Polymer bulk density (g/cc) | Level of polymer odor (grade) |
|---|---|---|---|---|---|---|
| Example 5 | 12 | 203 | 98.6 | 4.5 | 0.46 | 2 |
| Example 6 | 95 | 201 | 98.5 | 4.0 | 0.48 | 2 |
| Comp. Example 4 | 5 | 174 | 98.2 | 5.1 | 0.41 | 3 |
| Comp. Example 5 | 200 | 168 | 98.3 | 4.8 | 0.40 | 2 |

*Concentration of a composition ($A_0$) comprising as the essential ingredients titanium, magnesium and a halogen.

EXAMPLE 7

(Preparation of solid component (A))

Into a flask thoroughly purged with nitrogen, 200 milliliters of dehydrated and deoxygenated n-heptane, 0.4 mol of $MgCl_2$ and 0.8 mol of $Ti(O-nC_4H_9)_4$ were introduced, and reaction was conducted at 95° C. for 2 hours. After completion of the reaction, the temperature within the flask was lowered to 35° C., and 60 milliliters of 1,3,5,7-tetramethylcyclotetrasiloxane was introduced and reaction was conducted for 5 hours. After the reaction, the reaction product was washed with n-heptane.

Next, into a flask thoroughly purged with nitrogen, 100 milliliters of n-heptane purified similarly as above was introduced, and the above product was introduced in an amount of 0.2 mol as calculated on Mg atoms. Then, 0.4 mol of $SiCl_4$ was introduced into the flask at 20° C. over 30 minutes, and reaction was carried out at 50° C. for 3 hours. After completion of the reaction, the product was washed with n-heptane to obtain a composition ($A_0$) comprising as the essential ingredients titanium, magnesium and a halogen.

Using this composition, preliminary polymerization was conducted as in Example 1 except for adding 0.91 milliliters of phenyltriethoxysilane in each of the first step and the second step, thus providing a solid component (A).

(Polymerization of propylene)

Polymerization was conducted as in Example 1 except for using the above obtained solid component (A) and using 59.4 milligrams of t-butyltriethoxysilane inand second-step preliminary polymerization was conducted at 75° C. The amount of polypropylene produced was 5.4 grams per gram of the composition. The solid component (A) thus obtained was used in the following polymerization.

(Polymerization of propylene)

Polymerization of propylene was conducted under the conditions in Example 1 except for using the solid component (A) obtained above. As a result, 227 grams of a polymer was obtained, with T-I.I=99.2 wt. %, MFR=3.6 g/10 min. and polymer bulk density=0.50 g/cc. The level of odor was grade-2.

EXAMPLE 9

(Preparation of solid component (A))

Into a flask thoroughly purged with nitrogen were introduced 50 milliliters of thoroughly purified n-heptane and 5 grams of a solid component prepared in the same manner as in Example 3 through the same preliminary polymerization as in Example 3.

Next, 0.12 milliliters of $(CH_3)_3CSi(CH_3)(OCH_3)_2$ as a silicon compound was introduced and then 0.5 gram of triethylaluminum and 0.75 gram of methylhydrogen polysiloxane were introduced and contact was effected at 30° C. for 2 hours. After completion of the contact reaction, the product was thoroughly washed with n-heptane. Then, the same amount as above of $(CH_3)_3CSi(CH_3)(OCH_3)_2$, triethylaluminum and methylhydrogenpolysiloxane were introduced and contact was effected under the same conditions as above. After completion of the contact, the product was thoroughly washed with n-heptane to obtain a solid component (A). A part of the solid component was taken out for examination of the content of the electron donor, which was found to be trace.

(Polymerization of propylene)

Polymerization of propylene was conducted under the conditions in Example 3 except for not using diphenyldimethoxysilane. As a result, 223.4 grams of a polymer was obtained, with T-I.I=99.3 wt. %, MFR=1.2 g/10 min. and polymer bulk density=0.50 g/cc. The level of odor was grade-1.

EXAMPLES 10 TO 12

A solid component (A) was prepared as in Example 9 except for changing as shown in Table 3 the type and the amount of a silicon compound and an organoaluminum used during the contact of the silicon compound. The results are shown in Table 3.

preliminary polymerization in the second step is conducted at 70° to 85° C. so that the amount of polymer produced is 2 to 5 g per gram of said composition.

3. The process according to claim 1, wherein titanium containing in the composition ($A_0$) is supplied by a titanium compound represented by the following formula:

$$Ti(OR^1)_{4-n}X_n$$

wherein $R^1$ stands for a hydrocarbon residue having 1 to 10 carbon atoms, X stands for a halogen atom and n is a number of from 0 to 4.

4. The process according to claim 1, wherein titanium contained in the composition ($A_0$) is supplied by a molecular compound formed by reaction of $TiX'_4$ (in which X' stands for a halogen atom) with an electron donor.

5. The process according to claim 1, wherein magne-

TABLE 3

| Example No. | Silicon compound (amount used) | Organo-aluminum (amount used) | Amount of methylhydrogen polysiloxane used (g) | Polymer yield (g) | T-I.I (wt. %) | MFR (g/10 min.) | Polymer odor (grade) | Polymer bulk density (g/cc) |
|---|---|---|---|---|---|---|---|---|
| 10 | (t-Bu).Si(OMe)$_3$ (0.22 ml) | triisobutyl-aluminum (0.95 g) | 1.2 | 198.4 | 98.1 | 2.1 | 1 | 0.48 |
| 11 | (t-Bu)(Me)Si(OMe)$_2$ (0.18 ml) | trioctyl-aluminum (1.53 g) | (not used) | 206.5 | 98.3 | 1.9 | 1 | 0.49 |
| 12 | (0.45 ml) | triethyl-aluminum (0.75 g) | 0.75 | 201.4 | 98.6 | 1.9 | 1 | 0.48 |

What is claimed is:

1. In a process for the homopolymerization or copolymerization of propylene comprising homopolymerizing propylene or copolymerizing propylene with an alpha-olefin copolymerizable there-with in an amount of up to 30% by weight of the propylene in the presence of a catalyst which is a combination of a solid component (A) obtained by subjecting a composition ($A_0$) comprising as the essential ingredients titanium, magnesium and a halogen to preliminary polymerization of the propylene conducted in the presence of said composition ($A_0$) in a slurry containing an organoaluminum compound, and an organoaluminum compound (B), the improvement comprising:
conducting said preliminary polymerization in two steps, wherein, in the first step, propylene is polymerized in a slurry containing said composition ($A_0$) in a concentration adjusted to 10–100 g/lit-solvent, which is higher than the concentration of the solid component (A) when the homopolymerization or copolymerization of propylene is conducted in a slurry of the solid component (A), at a temperature of 30° C. or less so that the amount of polymer produced is 0.001 to 1 g per gram of said composition ($A_0$) and wherein, in the second preliminary polymerization step, polymerization of said propylene is conducted at 60° C. or greater at the same concentration of composition ($A_0$) as in the first step so that the amount of polymer produced in this step is 1–10 g per gram of said composition ($A_0$).

2. The process according to claim 1, wherein the preliminary polymerization in the first step is conducted at 10° to 20° C. so that the amount of polymer produced is 0.1 to 0.7 g per gram of the composition ($A_0$), and the sium in the composition ($A_0$) is supplied by a magnesium compound selected from the group consisting of a magnesium dihalide, a dialkoxy magnesium, an alkoxy magnesium halide, a magnesium oxyhalide, a dialkyl magnesium, magnesium oxide, magnesium hydroxide and carboxylic acid salts of magnesium, where the alkyl or alkoxy group contains 1 to 6 carbon atoms and the carboxylic acid contains 2 to 20 carbon atoms.

6. The process according to claim 5, wherein the magnesium compound is a magnesium halide.

7. The process according to claim 1, wherein the halogen in the composition ($A_0$) is supplied as a magnesium compound and/or a titanium compound.

8. The process according to claim 1, wherein the halogen contained in the composition ($A_0$) is supplied by a halide selected from the group consisting of an aluminum halide, a silicon halide and a phosphorus halide.

9. The process according to claim 1, wherein an electron donor is present during preparation of the composition ($A_0$).

10. The process according to claim 9, wherein the electron donor is selected from the group consisting of esters and acid halides.

11. The process according to claim 10, wherein the electron donor is selected from the group consisting of esters of phthalic acid, esters of cellosolves and phthaloyl halides.

12. The process according to claim 11, wherein the electron donor is selected from the group consisting of a lower-alkyl phthalate and phthaloyl chloride.

13. The process according to claim 1, wherein the composition ($A_0$) further contains a compound selected from the group consisting of (a) a silicon compound selected from the group consisting of a silicon halide, a lower-alkylsilicon halide and an alkylhydrogen polysiloxane represented by the following formula:

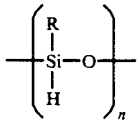

wherein R stands for a hydrocarbon residue having 1 to 10 carbon atoms, and n is a degree of polymerization, which is such that the polymer has a viscosity of 0.1 to 100 centistokes (cSt), (b) an aluminum compound selected from the group consisting of a lower-alkoxyaluminum, a lower-alkoxyaluminum halide and an aluminum halide, and (c) a lower-alkoxyboron.

14. The process according to claim 1, wherein the composition ($A_0$) is prepared by any one of the following methods:
  (a) A magnesium dihalide is contacted with an electron donor and a titanium-containing compound;
  (b) Alumina or magnesia is treated with a phosphorus halide compound and is then contacted with a magnesium halide, an electron donor and a halogen-containing titanium compound;
  (c) A magnesium halide is contacted with a titanium tetra-alkoxide and a polymeric silicon compound and the obtained solid component is contacted with a halogen-containing titanium compound and/or a silicon halide, the polymeric silicon compound being represented by the following formula:

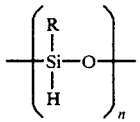

wherein R stands for a hydrocarbon residue having 1 to 10 carbon atoms, and n is a degree of polymerization, which is such that the polymer has a viscosity of 0.1 to 100 centistokes (cSt);
  (d) A magnesium compound is dissolved by means of a titanium tetra-alkoxide and an electron donor, a solid component is precipitated from the solution by a titanium- and halogen-compound or halogenating agent, and the solid component is contacted with a titanium compound;
  (e) An organic magnesium compound is reacted with a halogenating agent and a reducing agent, and the reaction product is contacted with an electron donor and a titanium compound; and
  (f) A magnesium alkoxide is contacted with a halogenating agent and/or a titanium compound in the presence or absence of an electron donor.

15. The process according to claim 1, wherein a silicon compound represented by the following formula is contacted with the composition ($A_0$) at 0°–100° C. before subjecting the composition ($A_0$) to the preliminary polymerization:

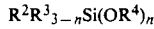

wherein $R^2$ stands for a branched hydrocarbon residue having 3 to 20 carbon atoms, $R^3$ stands for a branched or linear aliphatic hydrocarbon residue having 1 to 10 carbon atoms, $R^4$ stands for a linear aliphatic hydrocarbon residue having 1 to 4 carbon atoms, and n is a number of from 1 to 3.

16. The process according to claim 1, wherein the preliminary polymerization is conducted under such conditions that the polymerization temperature is 10° to 20° C. in the first step and 70° to 85° C. in the second step, and the concentration of the composition ($A_0$) is 20–50 g/lit.-solvent.

17. The process according to claim 1, wherein the amount of polymer produced in the preliminary polymerization is 0.1 to 0.7 g in the first step and 2 to 5 g in the second step per gram of the composition ($A_0$).

18. The process according to claim 1, wherein the sum of the amount of polymer produced in the first step and the second step of the preliminary polymerization is 1 to 5 g per gram of the composition ($A_0$).

19. The process according to claim 1, wherein a silicon compound represented by the following formula is contacted with the composition ($A_0$) at 0°–100° C. after subjecting the composition ($A_0$) to the preliminary polymerization:

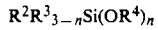

wherein $R^2$ stands for a branched hydrocarbon residue having 3 to 20 carbon atoms, $R^3$ stands for a branched or linear aliphatic hydrocarbon residue having 1 to 10 carbon atoms, $R^4$ stands for a linear aliphatic hydrocarbon residue having 1 to 4 carbon atoms, and n is a number of from 1 to 3.

20. The process according to claim 1, wherein the organoaluminum compound (B) is a compound represented by the general formula:

wherein $R^5$ and $R^6$, which may be the same or different, each stand for a hydrocarbon residue having 1 to about 20 carbon atoms or a hydrogen atom, $R^7$ stands for a hydrocarbon residue, X stands for a halogen atom, n is a number of $0 \leq n < 2$, and m is a number of $0 \leq m \leq 1$.

21. The process according to claim 1, wherein an aluminum compound represented by the following formula is concomitantly used:

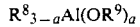

wherein a is a number of from 1 to 3, and $R^8$ and $R^9$, which may be the same or different, each stand for a hydrocarbon residue having 1 to about 20 carbon atoms.

22. The process according to claim 1, wherein said homopolymerization or copolymerization of propylene in the presence of a catalyst which is a combination of a solid component (A) and an organoaluminum compound (B) is conducted in a slurry of the solid component (A) at a concentration of 0.0001 to 0.1 g/lit-solvent.

23. In a process for the homopolymerization of propylene or copolymerization of propylene with another copolymerizable α-olefin in an amount of up to 30% by weight of the propylene in the presence of a catalyst which is a combination of a solid component (A) which is obtained by employing a composition ($A_0$) comprising as the essential ingredients a titanium compound of the formula: $Ti(OR^1)_{4-n}X_n$ wherein $R^1$ stands for a hydrocarbon residue of 1–10 carbon atoms, X is a halogen and n is a number of from 0–4, a magnesium compound selected from the group consisting of a magnesium dihalide, a dialkoxymagnesium, an alkoxymagnesium halide, a magnesium oxyhalide, a dialkylmagnesium, magnesium oxide, magnesium hydroxide and carboxylic acid salts of magnesium, wherein in the alkyl or alkoxy group contains 1-6 carbon atoms and the carboxylic acid contains 2-20 carbon atoms, the amount of said titanium compound relative to said magnesium compound ranging from $1 \times 10^{-4}$ to 1000 (molar ratio), and a halogen, in preliminary polymerization of propylene conducted in the presence of said composition ($A_0$) in a slurry containing an organoaluminum compound, and an organoaluminum compound (B), the improvement comprising:

conducting said preliminary polymerization in two steps, wherein, in the first step, propylene is polymerized in a slurry containing said composition ($A_0$) in a concentration adjusted to 10-100 g/lit-solvent, which is higher than the concentration of the solid component (A) when the homopolymerization or copolymerization of propylene is conducted in a slurry of the solid component (A), at a temperature of 10°-20 C. so that the amount of polymer produced is 0.001 to 1 g per gram of said composition ($A_0$) and wherein, in the second preliminary polymerization step, polymerization of said propylene is conducted at 70°-85° C. at the same concentration of composition ($A_0$) as in the first step so that the amount of polymer produced in the step is 1-10 g per gram of said composition ($A_0$).

* * * * *